US012313981B2

(12) United States Patent
Tanio

(10) Patent No.: US 12,313,981 B2
(45) Date of Patent: May 27, 2025

(54) FIXING DEVICE AND IMAGE FORMING APPARATUS INCLUDING SAME

(71) Applicant: KYOCERA Document Solutions Inc., Osaka (JP)

(72) Inventor: Koji Tanio, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/731,858

(22) Filed: Jun. 3, 2024

(65) Prior Publication Data

US 2024/0411251 A1 Dec. 12, 2024

(30) Foreign Application Priority Data

Jun. 8, 2023 (JP) ................................ 2023-094855

(51) Int. Cl.
*G03G 15/20* (2006.01)

(52) U.S. Cl.
CPC ..... *G03G 15/2028* (2013.01); *G03G 15/2064* (2013.01); *G03G 2215/2025* (2013.01)

(58) Field of Classification Search
None
See application file for complete search history.

(56) References Cited

U.S. PATENT DOCUMENTS

2012/0132559 A1* 5/2012 Okuma ............. G03G 15/0863 206/524.1
2013/0170870 A1* 7/2013 Yoon .................. G03G 15/0886 399/258
2015/0063868 A1 3/2015 Fukuda et al. ................ 399/122
2015/0153693 A1* 6/2015 Iwase ................ G03G 15/2028 399/124
2016/0282755 A1* 9/2016 Terakado ........... G03G 15/0865
2019/0163103 A1* 5/2019 Lizuka ............... G03G 21/1671
2019/0163121 A1* 5/2019 Wada ................ G03G 15/2017
2023/0082752 A1* 3/2023 Toyota ............... G03G 21/1633 399/328

(Continued)

FOREIGN PATENT DOCUMENTS

JP 07271223 A * 10/1995
JP 2014170152 A * 9/2014

(Continued)

*Primary Examiner* — Sevan A Aydin
(74) *Attorney, Agent, or Firm* — Stein IP, LLC

(57) ABSTRACT

A fixing device includes: a rotating member to be heated; a pressure rotating member; a housing; a sheet entrance port; a shutter member; and a biasing member. The shutter member slides between a first position for opening the sheet entrance port provided in the housing and a second position for closing the sheet entrance port. The biasing member biases the shutter member in a direction toward the second position. The shutter member includes a hook portion in which an engagement claw is formed, and when the shutter member is arranged in the second position, the engagement claw is opposite a portion to be engaged in the housing. When an external force directed toward the inside of the housing is applied to the shutter member arranged in the second position, the engagement claw engages the portion to be engaged to restrict the movement of the shutter member to the first position.

5 Claims, 7 Drawing Sheets

(56) References Cited

U.S. PATENT DOCUMENTS

| | | | | |
|---|---|---|---|---|
| 2023/0280675 A1* | 9/2023 | Minoshima | ........ | G03G 21/1633 399/122 |
| 2024/0111243 A1* | 4/2024 | Uehara | .............. | G03G 15/2017 |
| 2024/0142895 A1* | 5/2024 | Minamoto | ......... | G03G 15/0886 |
| 2024/0319662 A1* | 9/2024 | Minoshima | ........ | G03G 21/1647 |

FOREIGN PATENT DOCUMENTS

| | | |
|---|---|---|
| JP | 2015-064423 A | 4/2015 |
| JP | 2015-141252 A | 8/2015 |

* cited by examiner

FIXING DEVICE AND IMAGE FORMING APPARATUS INCLUDING SAME

INCORPORATION BY REFERENCE

This application is based upon and claims the benefit of priority from the corresponding Japanese Patent Application No. 2023-094855 (filed on Jun. 8, 2023), the entire contents of which are incorporated herein by reference.

BACKGROUND

The present disclosure relates to a fixing device which is used in an image forming apparatus such as a copying machine, a printer, a facsimile or a multifunctional peripheral thereof, and an image forming apparatus which includes such a fixing device.

In an image forming apparatus of an electrophotographic system, in order to fix a toner image on a sheet, a fixing device is widely used that includes a fixing member in which a fixing roller or a fixing belt (rotating member to be heated) and a pressure roller (pressure rotating member) are pressed against each other. In the fixing device described above, the sheet is passed through a fixing nip portion formed with the fixing roller or the fixing belt and the pressure roller, the toner image is heated and pressurized and thus the toner image is melted and fixed on the sheet.

In a fixing device of a belt fixing system which uses a fixing belt as a rotating member to be heated, a primary current flows through the fixing belt. Hence, according to occupational safety and health regulations, it is necessary to prevent an operator from touching the fixing belt when jam processing or maintenance of the fixing device is performed. When the operator touches the fixing belt, image degradation may be caused by damage or dirt on the fixing belt.

SUMMARY

A fixing device according to an aspect of the present disclosure includes a rotating member to be heated, a pressure rotating member, a housing, a sheet entrance port, a shutter member and a biasing member, and heats and pressurizes a sheet passing through a fixing nip portion to melt and fix an unfixed toner image on the sheet. The pressure rotating member is pressed against the rotating member to be heated to form the fixing nip portion. The housing stores the rotating member to be heated and the pressure rotating member. The sheet entrance port is provided in the housing, and a sheet that is conveyed to the fixing nip portion is passed through the sheet entrance port. The shutter member is supported by the housing and slides between a first position for opening the sheet entrance port and a second position for closing the sheet entrance port. The biasing member biases the shutter member in a direction toward the second position. The shutter member includes a hook portion in which an engagement claw is formed, and when the shutter member is arranged in the second position, the engagement claw is opposite a portion to be engaged in the housing. When an external force directed toward the inside of the housing is applied to the shutter member arranged in the second position, the engagement claw engages the portion to be engaged to restrict the movement of the shutter member to the first position.

DETAILED DESCRIPTION

Figure 1:
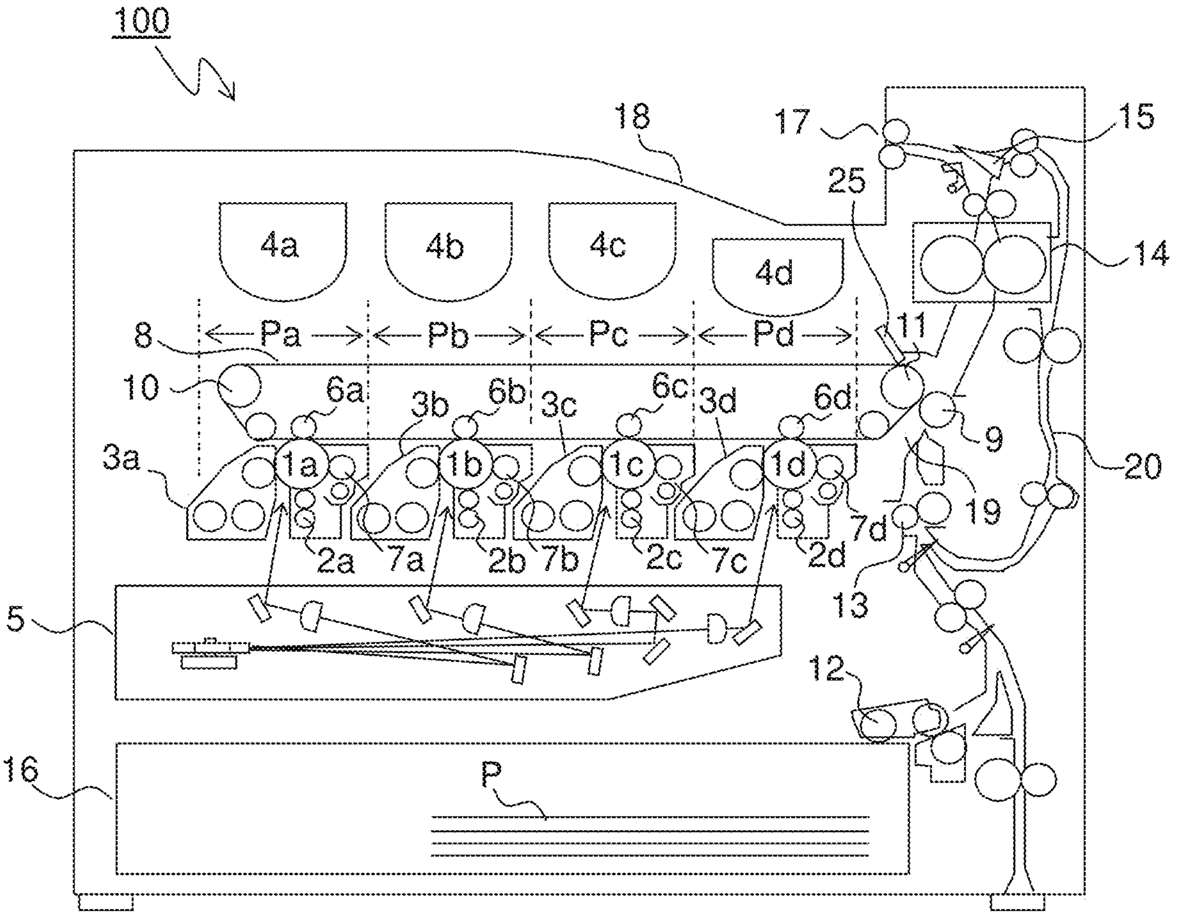
FIG. 1 is a schematic cross-sectional view showing an overall configuration of an image forming apparatus according to an embodiment of the present disclosure.

An embodiment of the present disclosure will be described below with reference to drawings. FIG. 1 is a cross-sectional view showing an internal structure of an image forming apparatus 100 according to the embodiment of the present disclosure. In the main body of the image forming apparatus 100 (here, a color printer), four image formation units Pa, Pb, Pc and Pd are sequentially provided from an upstream side (the left side in FIG. 1) in the conveyance direction. These image formation units Pa to Pd are provided according to images of four different colors (yellow, cyan, magenta and black), and the image formation units Pa to Pd each perform steps of charging, exposure, development and transfer to sequentially form images of yellow, cyan, magenta and black.

In these image formation units Pa to Pd, photosensitive drums (image carrying members) 1*a*, 1*b*, 1*c* and 1*d* are provided which carry visible images (toner images) of the individual colors. An intermediate transfer belt (intermediate transfer member) 8 which is rotated by a belt drive motor (not shown) in a counterclockwise direction in FIG. 1 is further provided adjacent to the image formation units Pa to Pd. The toner images formed on the photosensitive drums 1*a* to 1*d* are sequentially and primarily transferred on the intermediate transfer belt 8 which is moved in contact with the photosensitive drums 1*a* to 1*d*, and are superimposed on each other. Thereafter, the toner images primarily transferred on the intermediate transfer belt 8 are secondarily transferred, by a secondary transfer roller 9, on a transfer sheet P serving as an example of a recording medium. Furthermore, in the transfer sheet P on which the toner images have been secondarily transferred, the toner images are fixed by a fixing device 14, and thereafter the transfer sheet P is ejected from the main body of the image forming apparatus 100. While the photosensitive drums 1*a* to 1*d* are being rotated in a clockwise direction in FIG. 1, image formation process is performed on the photosensitive drums 1*a* to 1*d*.

The transfer sheet P on which the toner images are secondarily transferred is stored in a sheet cassette 16 arranged in a lower portion of the main body of the image forming apparatus 100, and is conveyed via a paper feed roller 12 and a registration roller pair 13 along a sheet conveyance path 19 into a nip portion between the secondary transfer roller 9 and a drive roller 11 for the intermediate transfer belt 8. As the intermediate transfer belt 8, a dielectric resin sheet is used, and a (seamless) belt which has no seam is mainly used. On the downstream side of the secondary transfer roller 9, a blade-shaped belt cleaner 25 for removing the toners and the like left on the surface of the intermediate transfer belt 8 is arranged.

The image formation units Pa to Pd will then be described. Around and below the photosensitive drums 1*a* to 1*d* which are rotatably provided, charging devices 2*a*, 2*b*, 2*c* and 2*d* which charge the photosensitive drums 1*a* to 1*d*, an exposure device 5 which exposes image information on the photosensitive drums 1*a* to 1*d*, development devices 3*a*, 3*b*, 3*c* and 3*d* which form the toner images on the photosensitive drums 1*a* to 1*d* and cleaning devices 7*a*, 7*b*, 7*c* and 7*d* which remove developers (toners) and the like left on the photosensitive drums 1*a* to 1*d* are provided.

When image data is input from a host device such as a personal computer, the charging devices 2*a* to 2*d* first charge the surfaces of the photosensitive drums 1*a* to 1*d* uniformly. Then, the exposure device 5 applies light according to the image data, and thus electrostatic latent images corresponding to the image data are formed on the photosensitive drums 1*a* to 1*d*. Predetermined amounts of two-component developers including the toners of yellow, cyan, magenta and black are charged into the development devices 3*a* to 3*d*, respectively. When the ratios of the toners in the two-component developers charged into the development devices 3*a* to 3*d* drop below specified values due to the formation of the toner images which will be described later, the toners are supplied from the toner containers 4*a* to 4*d* to the development devices 3*a* to 3*d*. The toners in the developers are supplied by the development devices 3*a* to 3*d* on the photosensitive drums 1*a* to 1*d*, and are electrostatically adhered thereto. In this way, the toner images corresponding to the electrostatic latent images formed by the exposure from the exposure device 5 are formed.

Then, an electric field is applied by the primary transfer rollers 6*a* to 6*d* at a predetermined transfer voltage between the primary transfer rollers 6*a* to 6*d* and the photosensitive drums 1*a* to 1*d*, and thus the toner images of yellow, cyan, magenta and black on the photosensitive drums 1*a* to 1*d* are primarily transferred on the intermediate transfer belt 8. These images are formed to have a predetermined positional relationship. Thereafter, in order to prepare the subsequent formation of electrostatic latent images, the toners and the like left on the surfaces of the photosensitive drums 1*a* to 1*d* are removed by the cleaning devices 7*a* to 7*d* after the primary transfer.

The intermediate transfer belt 8 is stretched over a driven roller 10 on the upstream side and a drive roller 11 on the downstream side. When the intermediate transfer belt 8 starts to rotate in the counterclockwise direction due to the rotation of the drive roller 11 caused by the belt drive motor (not shown), the transfer sheet P is conveyed from the registration roller pair 13 with predetermined timing into a secondary transfer nip portion N (see FIG. 2) between the drive roller 11 and the secondary transfer roller 9 provided adjacent thereto. Then, the toner images on the intermediate transfer belt 8 are secondarily transferred on the transfer sheet P which is being passed through the secondary transfer nip portion N.

The transfer sheet P on which the toner images have been secondarily transferred is conveyed to the fixing device 14. The fixing device 14 includes a fixing belt 14*a*, a pressure roller 14*b* and a heater 14*c* (see FIG. 2 for all of them) which is arranged inside the fixing belt 14*a*. The fixing belt 14*a* is heated by the heater (heating device) 14*c*. The pressure roller 14*b* is pressed against the fixing belt 14*a* to form a fixing nip portion, and provides a rotational drive force to the fixing belt 14*a*. Instead of the heater 14*c*, an induction heating unit may be provided outside the fixing belt 14*a*.

The transfer sheet P which has been conveyed to the fixing device 14 is heated and pressurized by the fixing belt 14*a* and the pressure roller 14*b*, the toner images are fixed on the surface of the transfer sheet P and thus a predetermined full color image is formed. The conveyance direction of the transfer sheet P on which the full color image has been formed is distributed by a branch portion 15 that is branched in a plurality of directions, and the transfer sheet P is ejected by an ejection roller pair 17 to an ejection tray 18 without being processed (or after being fed to a double-sided conveyance path 20 such that images are formed on both surfaces).

Figure 2:
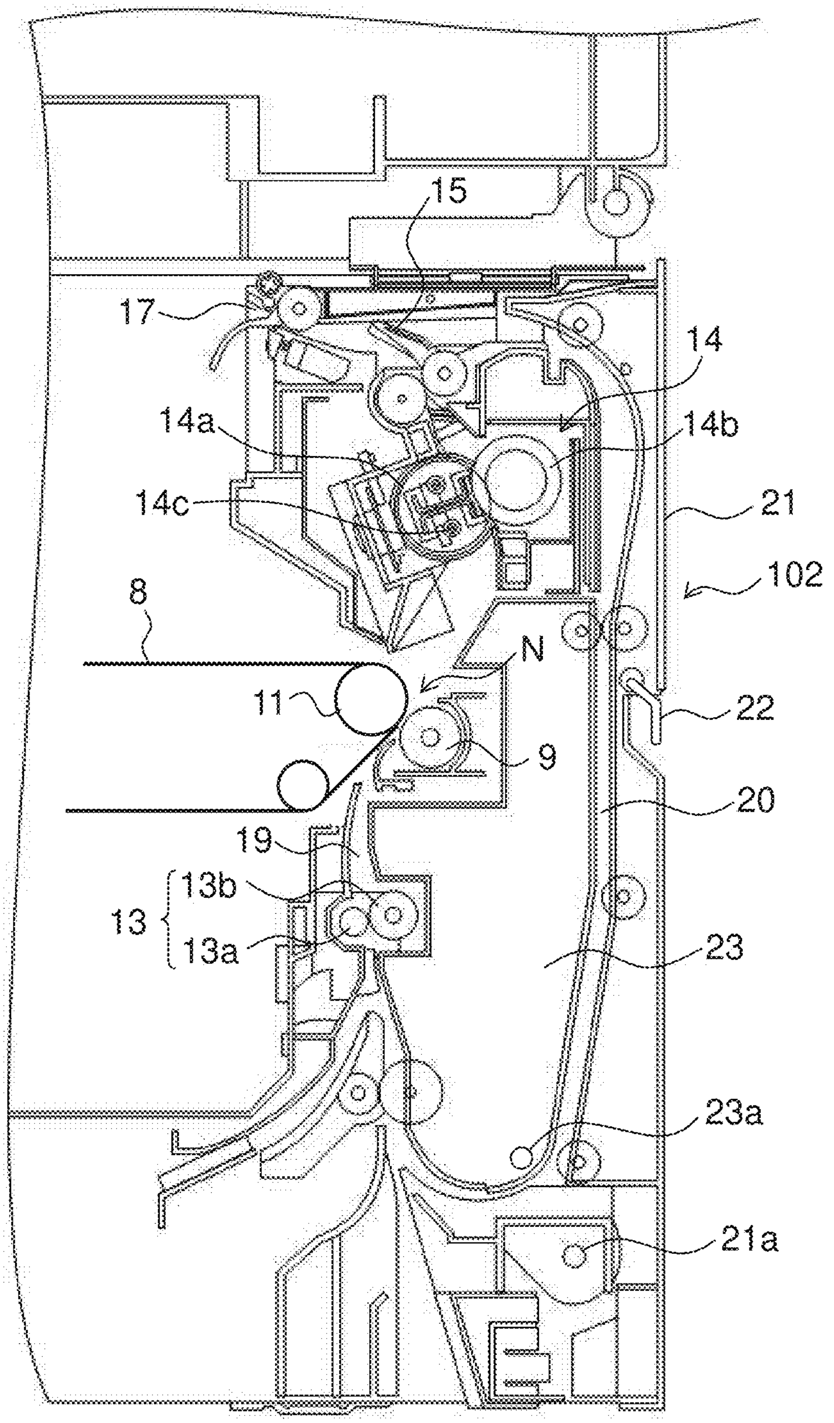
FIG. 2 is a partial cross-sectional view around a sheet conveyance path and a double-sided conveyance path in the image forming apparatus according to the present embodiment.

FIG. 2 is a partial cross-sectional view around the sheet conveyance path 19 and the double-sided conveyance path 20 in the image forming apparatus 100 according to the present embodiment. An opening/closing cover 21 forms a side surface 102 of the image forming apparatus 100, and is turnably supported by a cover support shaft 21*a* which is provided in a lower portion of the main body of the image forming apparatus 100. The inner side surface of the opening/closing cover 21 forms a conveyance surface of the double-sided conveyance path 20 on one side (outer side).

A handle portion 22 is provided on the side surface of the opening/closing cover 21. One end portion of the handle portion 22 engages engagement pins (not shown) provided on a front surface side frame and a back surface side frame of the main body of the image forming apparatus 100 to hold the opening/closing cover 21 in a closed state. When the opening/closing cover 21 is opened, the handle portion 22 is turned to release the engagement of the engagement pins.

A conveyance unit 23 is arranged on the inner side of the opening/closing cover 21. The conveyance unit 23 is turnably supported by the main body of the image forming apparatus 100 about a unit support shaft 23*a*, and forms parts of the conveyance surfaces of the double-sided conveyance path 20 and the sheet conveyance path 19. The double-sided conveyance path 20 extends between the inner side surface of the opening/closing cover 21 and the outer side surface of the conveyance unit 23 along the side surface 102 of the image forming apparatus 100 in an up/down direction, and is curved in a substantially C-shape to merge into the sheet conveyance path 19. On the inner side surface of the conveyance unit 23, a roller 13*b* on one side of the registration roller pair 13 and the secondary transfer roller 9 are provided sequentially from the upstream side in the conveyance direction of the transfer sheet P (the lower side in FIG. 2).

Only the opening/closing cover 21 is turned in an open direction relative to the image forming apparatus 100 to enter an open state, and thus the double-sided conveyance path 20 is exposed over a wide range. The opening/closing cover 21 is turned in the open direction together with the conveyance unit 23, and thus the conveyance unit 23 is separated from the side of the main body of the image forming apparatus 100, with the result that the sheet conveyance path 19 is exposed over a wide range. On the other hand, the opening/closing cover 21 is turned in a closed direction together with the conveyance unit 23 to enter the closed state, and thus the conveyance unit 23 makes contact with the side of the main body of the image forming apparatus 100, with the result that the secondary transfer roller 9 is pressed against the drive roller 11 via the intermediate transfer belt 8.

Figure 3:
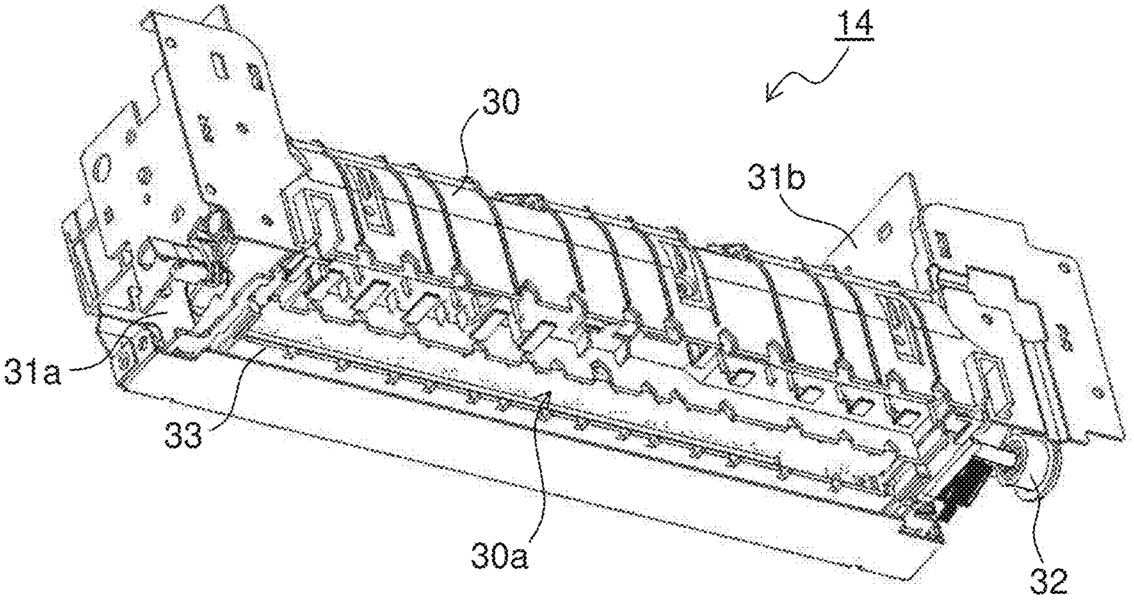
FIG. 3 is a perspective view when a fixing device is viewed from an upstream side in the conveyance direction of a transfer sheet, and is a diagram showing a state where a shutter member is arranged in an open position.
Figure 4:
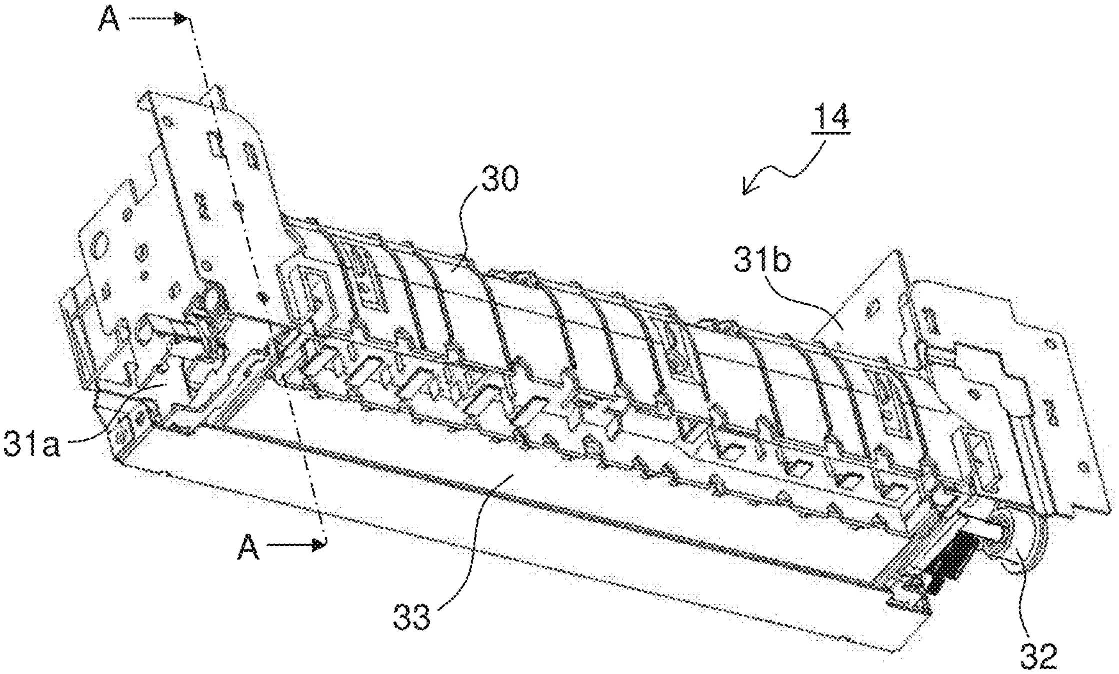
FIG. 4 is a perspective view when the fixing device is viewed from the upstream side in the conveyance direction of the transfer sheet, and is a diagram showing a state where the shutter member is arranged in a closed position.
Figure 5:
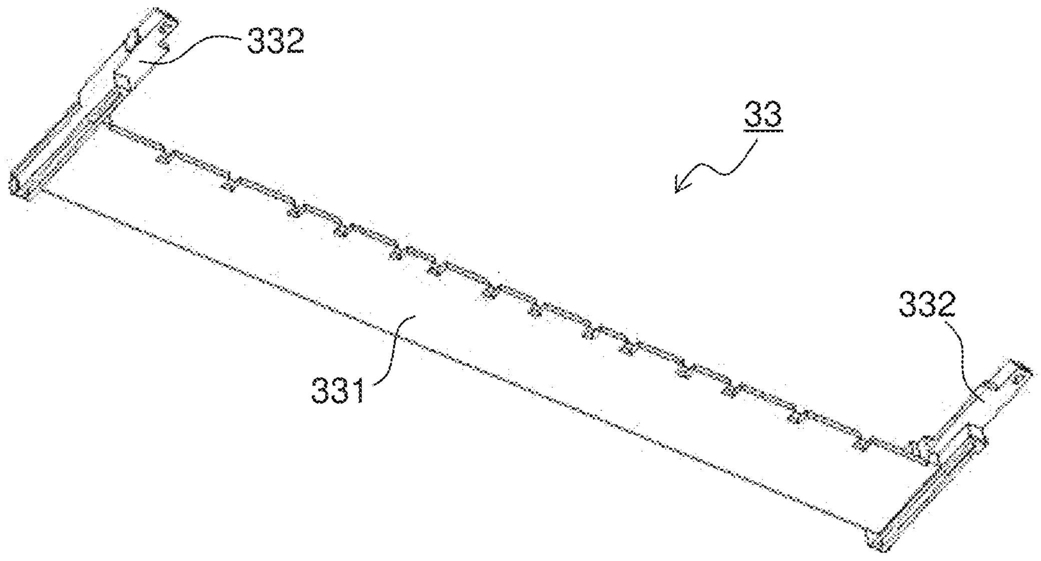
FIG. 5 is a perspective view of the shutter member.
Figure 6:
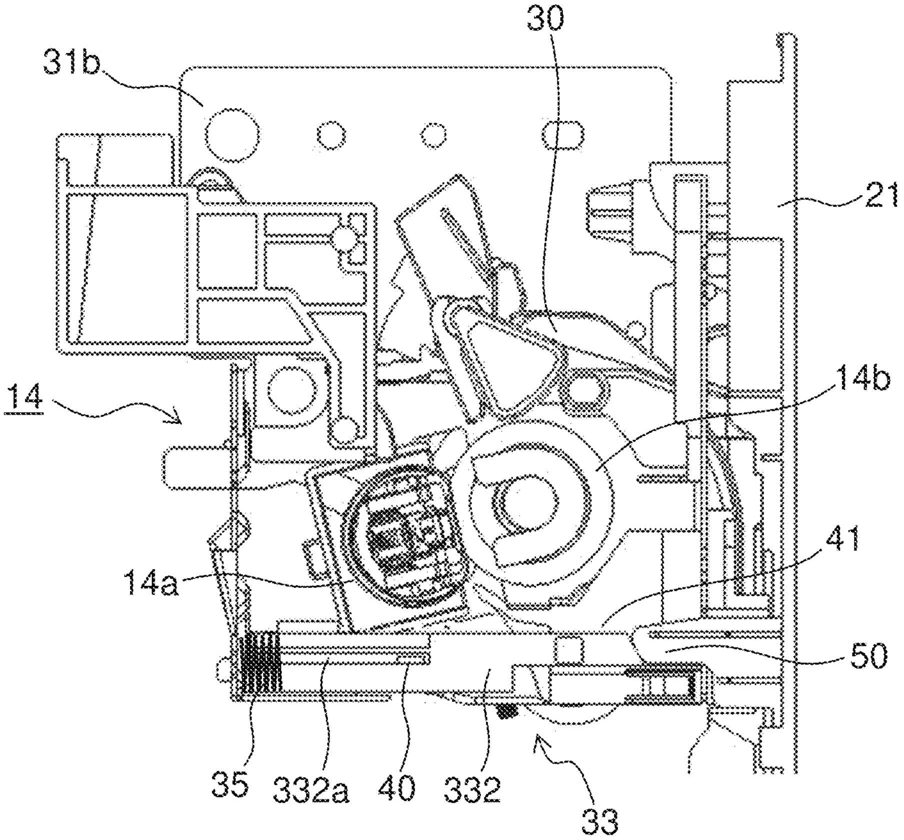
FIG. 6 is a side cross-sectional view of one end side of the fixing device in a longitudinal direction.

The configuration of the fixing device 14 will then be described. FIGS. 3 and 4 are perspective views when the fixing device 14 is viewed from the upstream side in the conveyance direction of the transfer sheet P (the lower side in FIG. 2), and are diagrams showing a state where a shutter member 33 is arranged in an open position and a state where the shutter member 33 is arranged in a closed position, respectively. FIG. 5 is a perspective view of the shutter member 33. FIG. 6 is a side cross-sectional view (cross-sectional view taken along line AA indicated by arrows in FIG. 4) of one end side of the fixing device 14 in a longitudinal direction.

The fixing device 14 includes a housing 30 and side plates 31*a* and 31*b* which are fixed to both end portions of the housing 30 in the longitudinal direction. In the housing 30, the fixing belt 14*a* and the pressure roller 14*b* are stored. In the lower surface of the housing 30, a sheet entrance port 30*a* is formed. The transfer sheet P which has been passed through the secondary transfer nip portion N (see FIG. 2) is passed through the sheet entrance port 30*a* and is guided into the fixing nip portion formed with the fixing belt 14*a* and the pressure roller 14*b*.

On the side of the side plate 31*b*, a drive input gear 32 is arranged. The drive input gear 32 is fixed to the rotation shaft of the pressure roller 14*b*. A rotational drive force is transmitted to the pressure roller 14*b* from a fixing drive motor (not shown) via the drive input gear 32, and thus the pressure roller 14*b* is rotated at a predetermined speed. In this way, the fixing belt 14*a* which is pressed against the pressure roller 14*b* follows the pressure roller 14*b* to rotate.

The shutter member 33 is provided in the housing 30. As shown in FIG. 5, the shutter member 33 includes a plate-shaped main body portion 331 which overlaps the sheet entrance port 30*a* and a pair of support portions 332 which are formed at both end portions of the main body portion 331 in the longitudinal direction. The shutter member 33 is slidably attached to the lower surface of the housing 30. The shutter member 33 is selectively arranged in the open position (first position, see FIG. 3) for opening the sheet entrance port 30*a* of the housing 30 or in the closed position (second position, see FIG. 4) for closing the sheet entrance port 30*a*.

As shown in FIG. 6, coil springs (biasing members) 35 are arranged between the inner side surface of the housing 30 and the support portions 332. The shutter member 33 is biased by the biasing force of the coil springs 35 in a direction toward the closed position from the open position (direction from left to right in FIG. 6). In the side surfaces of the support portions 332, guide grooves 332*a* are formed which extend along the sliding direction of the shutter member 33.

Figure 7:
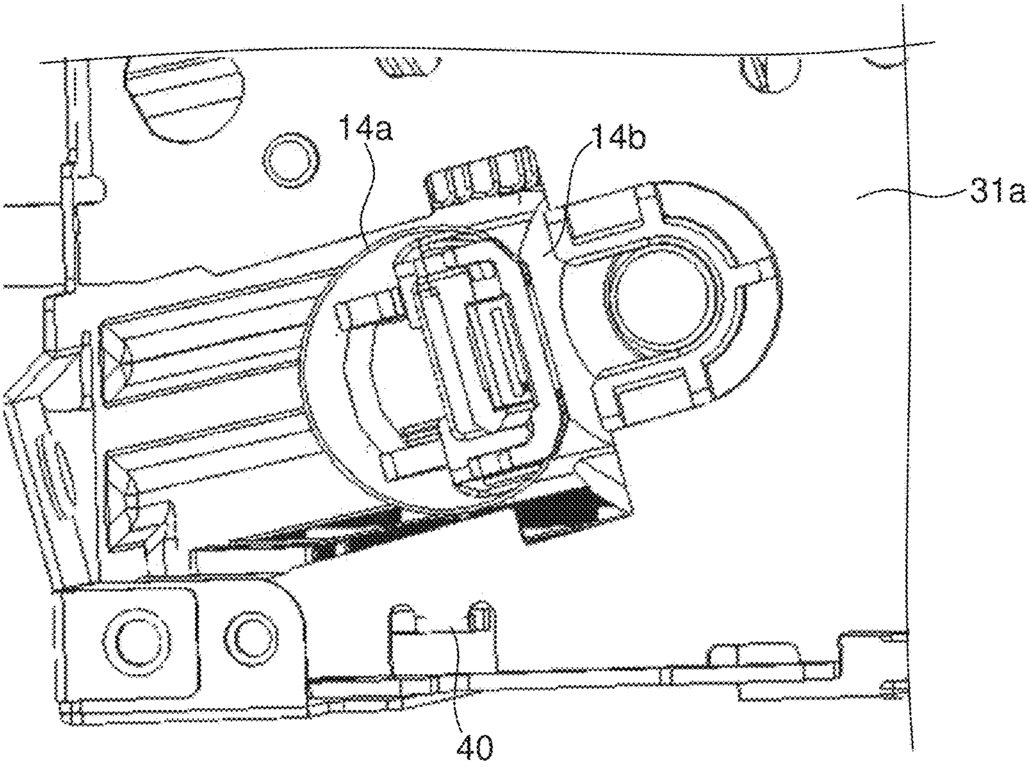
FIG. 7 is a partial enlarged view when an area around a lower portion of a side plate is viewed from the outside.

FIG. 7 is a partial enlarged view when an area around a lower portion of the side plate 31*a* is viewed from the outside. The same is true for the side plate 31*b*, and thus the description thereof is omitted. In the lower end portions of the side plates 31*a* and 31*b*, engagement protrusions 40 are formed. The engagement protrusions 40 are formed by bending parts of the side plates 31*a* and 31*b* inward, and engage the guide grooves 332*a* (see FIG. 6) formed in the side surfaces of the support portions 332.

On the inner sides of the side plates 31*a* and 31*b*, rail portions 41 (see FIG. 6) opposite upper portions of the support portions 332 are formed. The shutter member 33 slides between the open position and the closed position while being held in a horizontal posture by the engagement protrusions 40 which engage the guide grooves 332*a* and the rail portions 41.

On the inner side surface of the opening/closing cover 21, restriction protrusions 50 are formed in positions opposite the support portions 332. In the state of FIG. 6 where the opening/closing cover 21 is in the closed state, the restriction protrusions 50 make contact with the support portions 332. In this way, the shutter member 33 is arranged in the open position against the biasing force of the coil springs 35.

Figure 8:
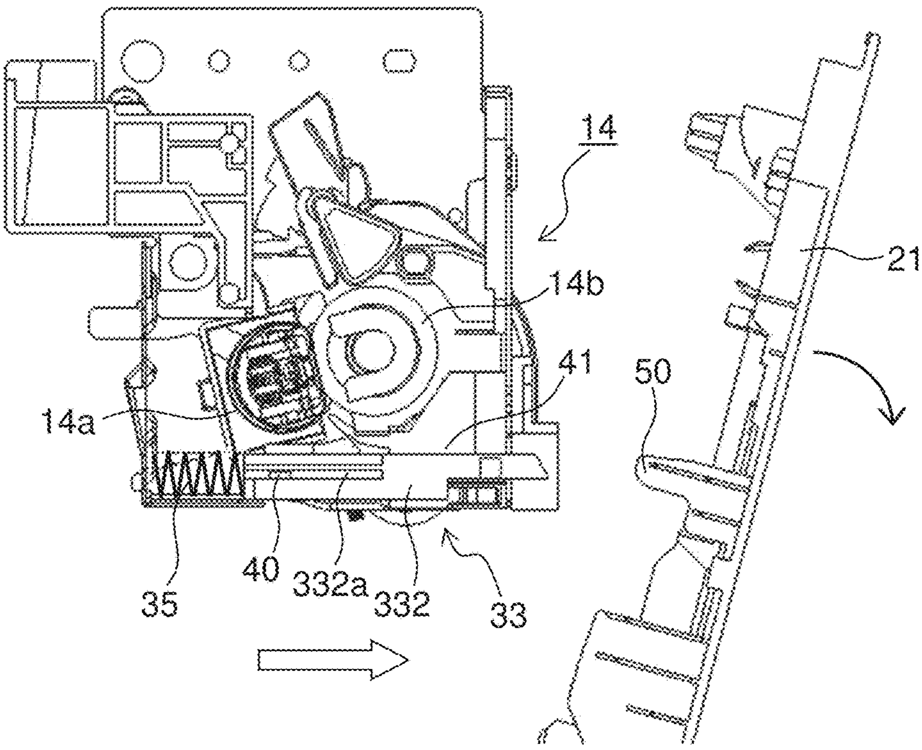
FIG. 8 is a side cross-sectional view showing a state where an opening/closing cover is opened from the state of FIG. 6 and thus the shutter member is arranged in the closed position.

When the opening/closing cover 21 is turned in the clockwise direction from the state of FIG. 6 to enter the open state, as shown in FIG. 8, the restriction protrusions 50 are separated from the support portions 332. Consequently, the shutter member 33 is moved from the open position to the closed position by the biasing force of the coil springs 35.

When the opening/closing cover 21 is turned in the counterclockwise direction from the state of FIG. 8 to enter the closed state, the restriction protrusions 50 press the support portions 332 to the open position. Consequently, the shutter member 33 is moved from the closed position to the open position while compressing the coil springs 35.

In the configuration described above, in conjunction with the opening/closing operation of the opening/closing cover 21, the shutter member 33 is selectively arranged in the open position or in the closed position. Hence, when the opening/closing cover 21 is opened, the shutter member 33 is reliably arranged in the closed position, and thus an operator is prevented from touching the fixing belt 14*a* when jam processing or maintenance of the fixing device 14 is performed. When the opening/closing cover 21 is closed, the shutter member 33 is reliably arranged in the open position, and thus the shutter member 33 is prevented from being forgotten to be opened.

Figure 9:
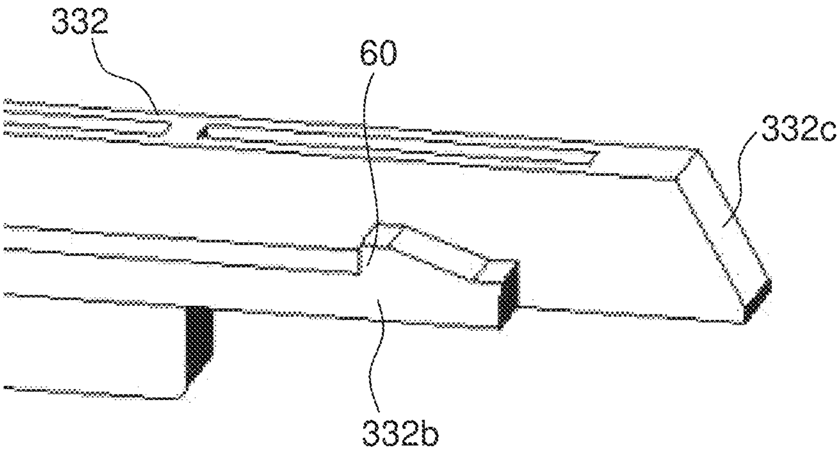
FIG. 9 is an enlarged perspective view when an area around a tip end portion of a support portion of the shutter member is viewed from the inside.

A mechanism for locking the shutter member 33 in the closed position will then be described. FIG. 9 is an enlarged perspective view when an area around a tip end portion of the support portion 332 of the shutter member 33 is viewed from the inside. As shown in FIG. 9, in the tip end portion of the support portion 332, a hook portion 332*b* is formed which extends along the inner side surface of the support portion 332. The hook portion 332*b* includes an engagement claw 60 which protrudes upward. In the tip end of the support portion 332, an inclination surface 332*c* is formed which is inclined downward as the support portion 332 extends toward the downstream side in the direction of movement of the shutter member 33 from the open position to the closed position (direction from left to right in FIG. 9).

Figure 10:
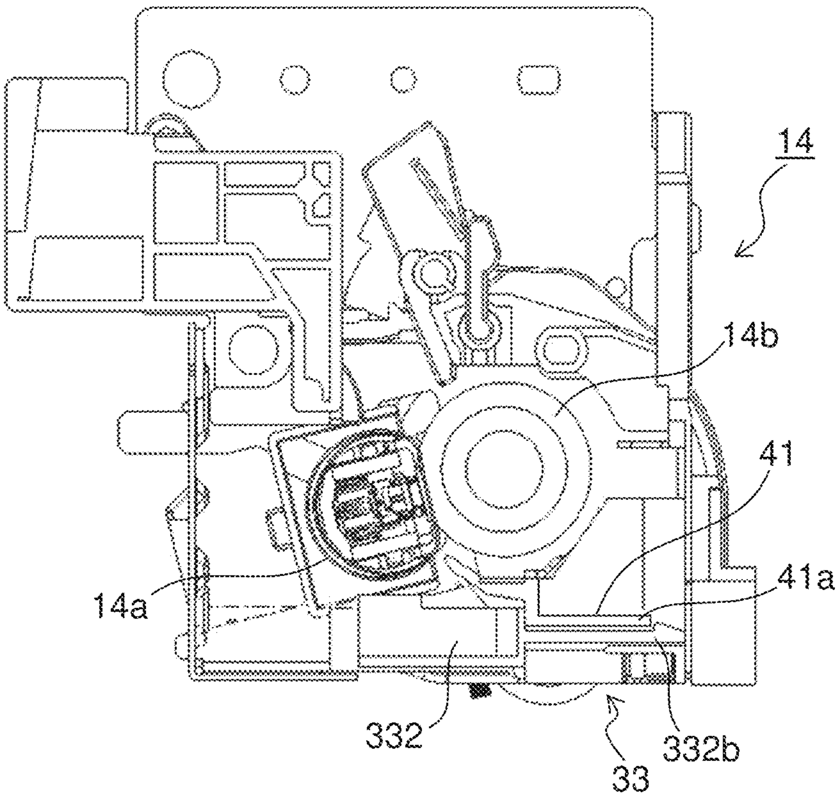
FIG. 10 is a side cross-sectional view showing a state where the shutter member is arranged in the closed position.

FIG. 10 is a side cross-sectional view showing a state where the shutter member 33 is arranged in the closed position. As shown in FIG. 10, when the shutter member 33 is arranged in the closed position by the biasing force of the coil springs 35, the engagement claw 60 (see FIG. 9) of the hook portion 332*b* is opposite the corner portion 41*a* of the rail portion 41.

Figure 11:
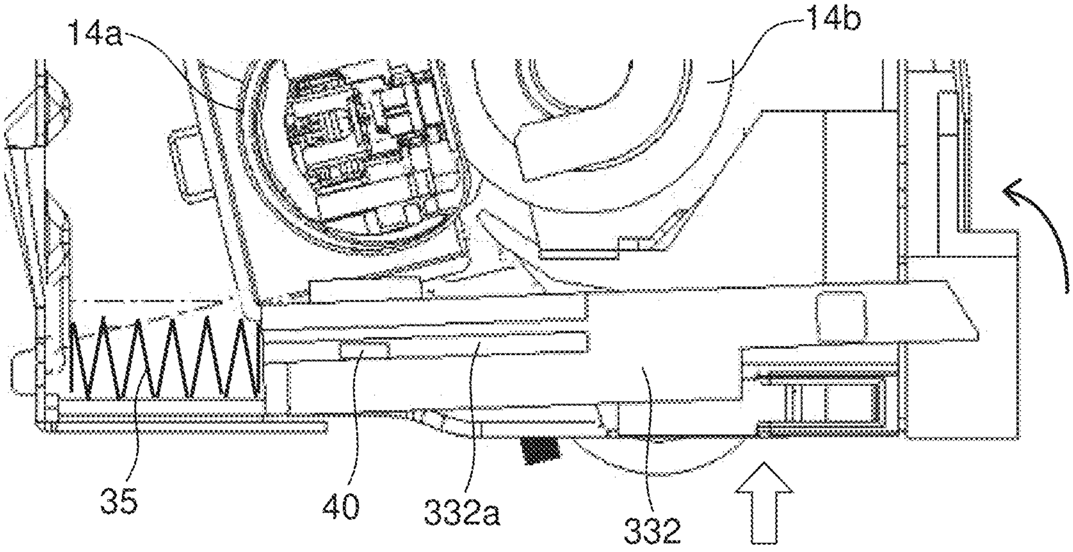
FIG. 11 is a diagram illustrating a mechanism in which when the shutter member arranged in the closed position is manually opened, a locked state is maintained by a hook portion.

Here, in the base end side (the left end side in FIG. 10) of the shutter member 33 adjacent to the coil spring 35, its movement in the up/down direction is restricted by the engagement of the engagement protrusion 40 and the guide groove 332*a* (see FIG. 11). On the other hand, the tip end side (the right end side in FIG. 10) of the shutter member 33 is a free end. Hence, in the state of FIG. 10, the tip end side of the shutter member 33 is inclined downward by its weight, and thus the engagement claw 60 of the hook portion 332*b* does not engage the corner portion 41*a* of the rail portion 41.

FIG. 11 is a diagram illustrating a mechanism in which when the shutter member 33 arranged in the closed position is manually opened, a locked state is maintained by the hook portion 332*b*. In the surface of the shutter member 33, an uneven shape in which a finger is caught is not formed. Hence, when the shutter member 33 arranged in the closed position is opened by a finger, it is necessary to apply a force in an upward direction in FIG. 11 (direction indicated by a white arrow).

Consequently, the tip end side of the shutter member 33 swings upward (direction indicated by a black arrow) with the engagement protrusion 40 used as a support point. In other words, the shutter member 33 swings in a direction in which the engagement claw 60 of the hook portion 332*b* engages the corner portion 41*a* of the rail portion 41. In the configuration described above, the shutter member 33 is not opened even when the shutter member 33 attempts to be opened with a finger.

The tip end of the support portion 332 is protected by a cover portion (not shown) which is formed in the housing 30. Although in the cover portion, a slit through which the restriction protrusion 50 of the opening/closing cover 21 can be passed is formed, a configuration is adopted in which a finger is prevented from entering the slit. Hence, the operator cannot open the shutter member 33 by pressing the tip end of the support portions 332.

When the hand is released from the shutter member 33, the shutter member 33 is pressed in the direction of the closed position (right direction in FIG. 11) by the biasing force of the coil springs 35, and thus the tip end side of the shutter member 33 is inclined downward by its weight, with the result that the engagement claw 60 of the hook portion 332*b* is disengaged from the corner portion 41*a* of the rail portion 41.

Figure 12:
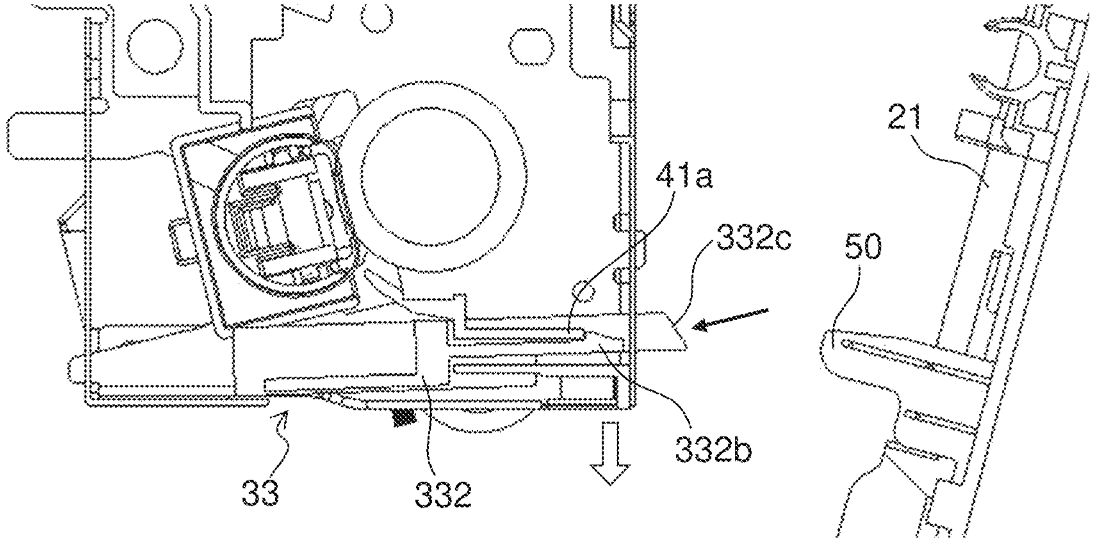
FIG. 12 is a diagram illustrating a mechanism in which the locked state of the shutter member arranged in the closed position is released by the opening/closing cover.

FIG. 12 is a diagram illustrating a mechanism in which the locked state of the shutter member 33 arranged in the closed position is released by the opening/closing cover 21. Since the inclination surface 332*c* is formed in the tip end of the support portion 332 of the shutter member 33, when the opening/closing cover 21 is closed, the restriction protrusion 50 presses the inclination surface 332*c* diagonally downward (in the direction of an arrow in FIG. 12). In this way, a force is applied to the shutter member 33 in a direction in which the engagement of the engagement claw 60 and the corner portion 41*a* of the rail portion 41 is released. Hence, even if the engagement claw 60 is not disengaged from the corner portion 41*a* only by the biasing force of the coil springs 35 and the weight of the shutter member 33, when the opening/closing cover 21 is closed, the shutter member 33 can be reliably moved from the closed position to the open position.

The present disclosure is not limited to the embodiment described above, and various changes can be made without departing from the spirit of the present disclosure. For example, although in the above embodiment, the fixing device 14 of a belt heating system which includes the seamless fixing belt 14*a* as the rotating member to be heated is illustrated, the present disclosure can be likewise applied to a fixing device which includes a rotating member to be heated, such as a fixing roller, other than the fixing belt 14*a*. Since when a fixing roller is touched with a hand, a fingerprint or dirt may be adhered to the fixing roller to adversely affect an image, the application of the present disclosure is effective.

Although in the above embodiment, the description is given using, as an example, the color printer serving as the image forming apparatus 100 as shown in FIG. 1, the present disclosure is not limited to the color printer, and can be applied to image forming apparatuses including a fixing device such as a color copying machine, a color multifunctional peripheral, a monochrome printer and a monochrome copying machine.

The present disclosure can be utilized for image forming apparatuses including a fixing device. By the utilization of the present disclosure, it is possible to provide an image forming apparatus in which a shutter member for preventing contact with a fixing member can be opened and closed, and locking in a closed state and unlocking can be achieved with a simple configuration.

What is claimed is:

1. A fixing device comprising:

a rotating member to be heated;

a pressure rotating member that is pressed against the rotating member to be heated to form a fixing nip portion;

a housing that stores the rotating member to be heated and the pressure rotating member;

a sheet entrance port which is provided in the housing and through which a sheet that is conveyed to the fixing nip portion is passed;

a shutter member that is supported by the housing and slides between a first position for opening the sheet entrance port and a second position for closing the sheet entrance port; and a biasing member that biases the shutter member in a direction toward the second position, wherein the fixing device heats and pressurizes the sheet passing through the fixing nip portion to melt and fix an unfixed toner image on the sheet, the shutter member includes a hook portion in which an engagement claw is formed, and when the shutter member is arranged in the second position, the engagement claw is opposite a portion to be engaged in the housing and when an external force directed toward an inside of the housing is applied to the shutter member arranged in the second position, the engagement claw engages the portion to be engaged to restrict a movement of the shutter member to the first position.

2. The fixing device according to claim 1, wherein the shutter member includes a flat plate-shaped main body portion that overlaps the sheet entrance port and a pair of support portions that are formed at both end portions of the main body portion in a longitudinal direction, in each of the pair of support portions, a guide groove is formed that extends along a sliding direction of the shutter member and engages an engagement protrusion of the housing and when the external force directed toward the inside of the housing is applied to the shutter member arranged in the second position, the shutter member swings, with the engagement protrusion used as a support point, in a direction in which the engagement claw engages the portion to be engaged.

3. The fixing device according to claim 1, wherein the rotating member to be heated is a fixing belt.

4. An image forming apparatus comprising:

an image formation unit that forms a toner image on a sheet; and the fixing device according to claim 1 that melts and fixes, on the sheet, the toner image formed by the image formation unit, wherein the image forming apparatus includes an opening/closing cover that forms a side surface of the image forming apparatus and is supported such that the opening/closing cover can be turned between a closed state where the opening/closing cover is arranged opposite the fixing device and an open state where the opening/closing cover is separated from the fixing device, in the opening/closing cover, a restriction protrusion is formed that makes contact with the shutter member in the closed state, when the opening/closing cover is in the closed state, the shutter member is pressed by the restriction protrusion to be arranged in the first position against a biasing force of the biasing member and when the opening/closing cover is in the open state, the shutter member is arranged in the second position by the biasing force of the biasing member.

5. The image forming apparatus according to claim 4, wherein the sheet entrance port is formed in a lower surface of the housing, the shutter member is supported to be able to slide between the first position and the second position in a horizontal direction and in a part of the shutter member with which the restriction protrusion makes contact, an inclination surface is formed that is inclined downward as the inclination surface extends toward a downstream side in a direction in which the shutter member is moved from the first position to the second position.

* * * * *